Dec. 22, 1931.  C. J. CALMUS ET AL  1,837,754
METHOD OF PRODUCING ELECTRICAL APPARATUS
Filed June 12, 1928    2 Sheets-Sheet 1
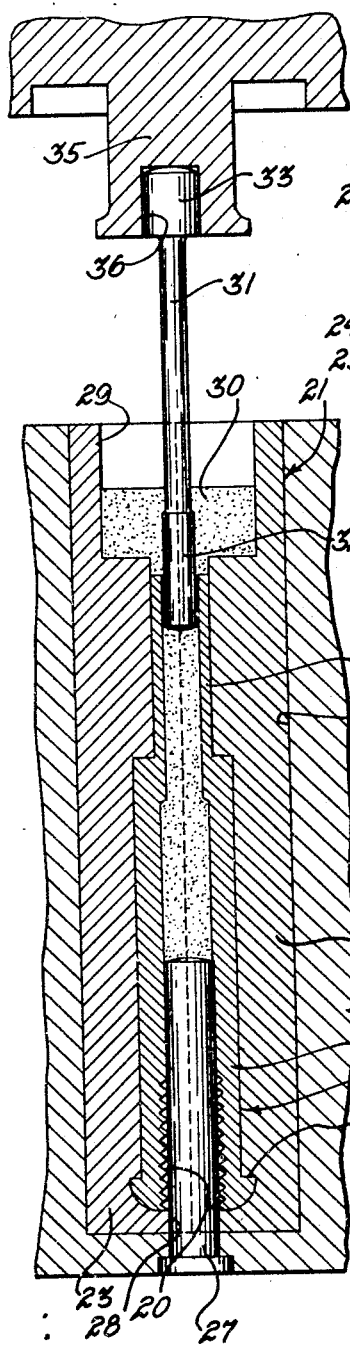
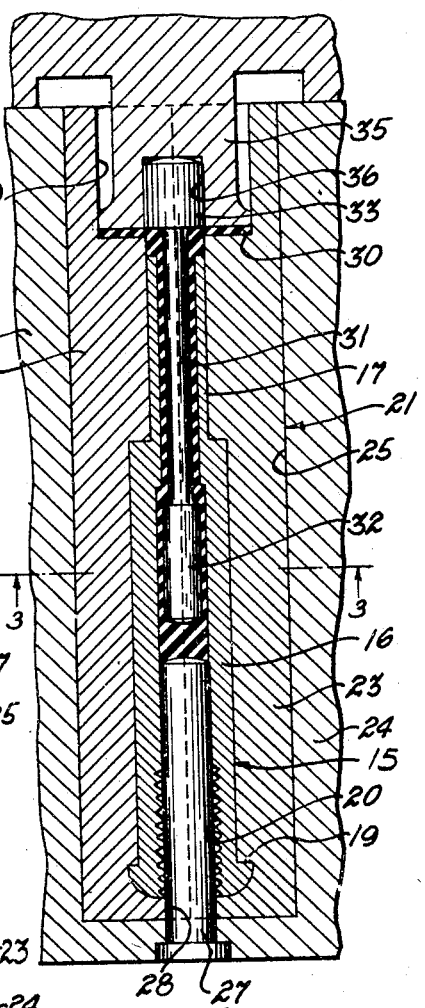
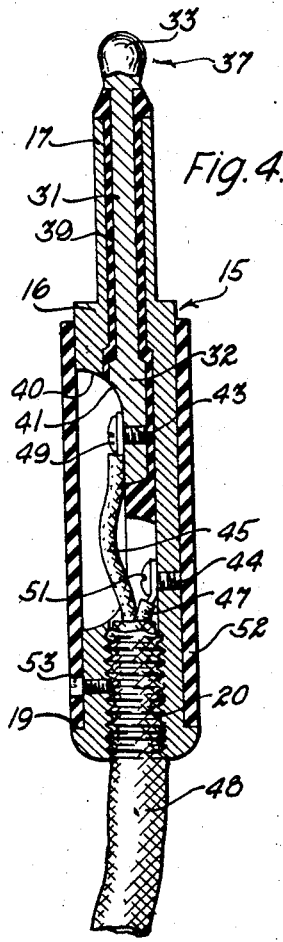
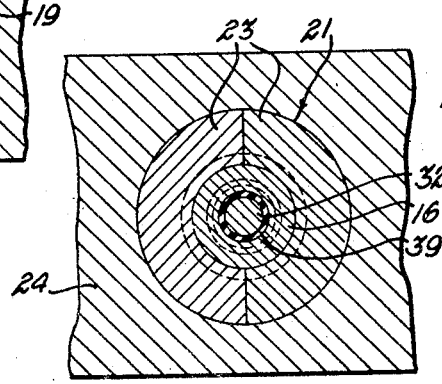
Inventors
Clarence J. Calmus
James H. Tomlin
by　　　　　　Atty.

Dec. 22, 1931.  C. J. CALMUS ET AL  1,837,754
METHOD OF PRODUCING ELECTRICAL APPARATUS
Filed June 12, 1928  2 Sheets-Sheet 2
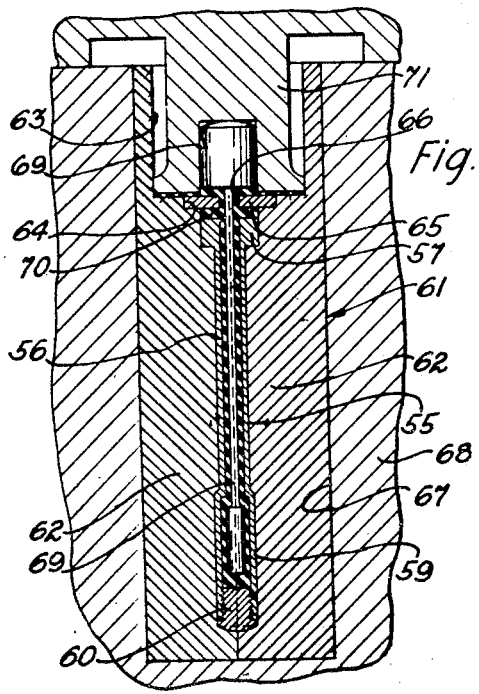
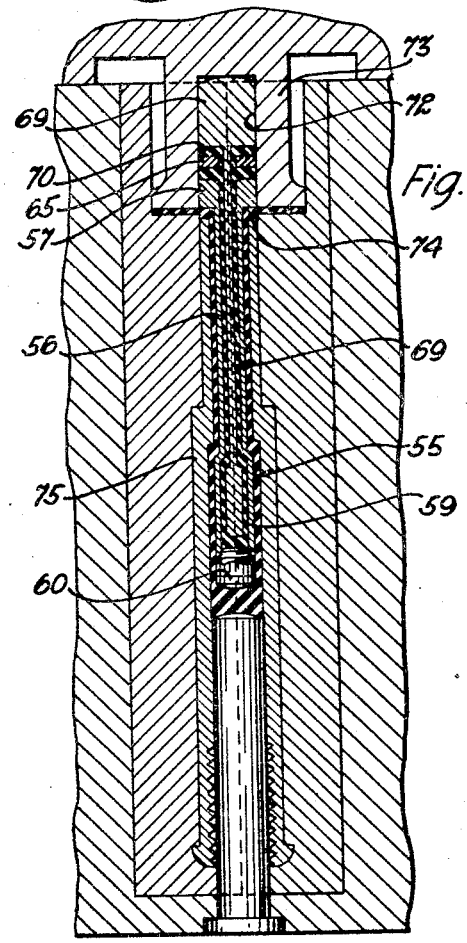
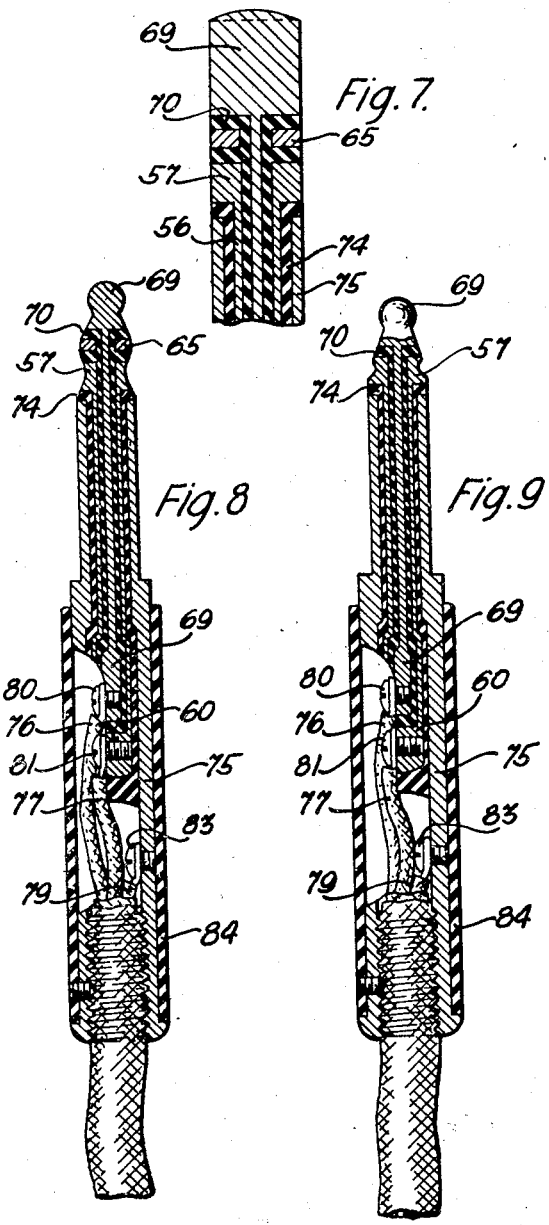
Inventors
Clarence J. Calmus
James H. Tomlin
by  H. A. Patterson  Att'y.

Patented Dec. 22, 1931

1,837,754

UNITED STATES PATENT OFFICE

CLARENCE JOSEPH CALMUS, OF BROOKFIELD, AND JAMES HARVEY TOMLIN, OF CICERO, ILLINOIS, ASSIGNORS TO WESTERN ELECTRIC COMPANY, INCORPORATED, OF NEW YORK, N. Y., A CORPORATION OF NEW YORK

METHOD OF PRODUCING ELECTRICAL APPARATUS

Application filed June 12, 1928. Serial No. 284,846.

This invention relates to a method of producing electrical apparatus, and more particularly to a method of assembling electrical connectors.

An object of the invention is to provide an expeditious and economical method of producing electrical connectors.

In a method embodying the invention, a tubular casing is placed in a die and a predetermined amount of a synthetic resin, such as a phenolic condensation product, in granular form is placed in the cavity in the casing. A cylindrical member which forms one of the connecting elements of the electrical connectors and which has a portion thereof of a diameter slightly less than the interior diameter of a portion of the casing, is inserted into the cavity and subjected to pressure sufficient to compact the synthetic resin and force it between the wall of the cavity and the exterior surface of the element whereby a layer of insulation separates these parts. Simultaneously with the application of pressure, heat is applied which results in the synthetic resin being formed into an infusible and insoluble mass. The thus assembled elements are removed from the die and machined to their final shape.

It is believed that a clear understanding of the invention may be had by reference to the following description, taken in conjunction with the accompanying drawings showing a device by means of which the method embodying the invention may be practiced and an article which may be manufactured by practicing that method, and in which, Fig. 1 is a longitudinal sectional view of a die block employed in one embodiment of the invention in which a tubular casing is positioned and showing a cylindrical connecting member partly inserted in the casing;

Fig. 2 is a longitudinal sectional view of the die block having a casing positioned therein and showing a connecting member completely inserted in the casing;

Fig. 3 is a transverse sectional view of the parts shown in Fig. 2 taken on the line 3—3 looking in the direction indicated by the arrows;

Fig. 4 is a longitudinal sectional view of a completed two connector plug;

Fig. 5 is a longitudinal sectional view of a die block employed in a second embodiment of the invention having positioned therein two connectors of a three connector plug;

Fig. 6 is a longitudinal sectional view of a die block having positioned therein a casing in which the two connectors shown in Fig. 5 have been inserted;

Fig. 7 is an enlarged longitudinal sectional view of the top portion of a three connector plug before the final machining operation;

Fig. 8 is a longitudinal sectional view of a completed three connector plug, and Fig. 9 is a longitudinal sectional view of another type of three connector plug.

The accompanying drawings, in which like reference characters represent the same parts in the various views, show three types of connecting plugs made in accordance with methods embodying the invention and show the steps performed in practicing those methods. In the practice of one method of manufacturing a two connector plug, a tubular casing designated generally by the numeral 15 (Fig. 1) is produced which comprises a tubular portion 16 having an end portion 17 of reduced diameter on one end thereof and a shoulder 19 formed on the other end thereof, which last mentioned end is internally threaded as shown at 20. The tubular casing 15 is positioned in a die 21 which is formed in two sections 23—23 having their inner surfaces machined to conform generally to the contour of the casing 15 which is inserted therein. The die with the enclosed casing therein is then placed in a cylindrical bore 25 formed in a die block 24 in such a position that a cylindrical molding member 27 projecting from the base of the die block 24 passes through an aperture 28 in the bottom of the die 21 and enters the casing 15 positioned therein. The upper end of the die 21 has a cylindrical bore 29 therein of somewhat greater diameter than that of the casing 15 and in which a predetermined amount of synthetic resin 30 in granular form may be placed.

Granular synthetic resin 30 is poured into the die filling the part of the tubular casing 16 above the molding member 27 and the tubular end portion 17 thereof, and filling the cylindrical bore 29 to a predetermined height.

A cylindrical connecting element or member 31 having at one end thereof a cylindrical portion 32 of a diameter slightly less than the inside diameter of the tubular portion 17 and having at the other end thereof a cylindrical portion 33 of a diameter which conforms approximately to the outer diameter of the portion 17 is then partially inserted into the tubular portion 17 as is shown in Fig. 1.

A cylindrical plunger 35 having a bore 36 therein is positioned above the die 21 so that the end portion 33 of the connecting member 31 enters the bore 36, whereupon pressure is applied to the plunger 35 to force it downwardly and heat is applied simultaneously in any well known manner (not shown) to the die block 24. The pressure of the plunger 35 will move the connecting member 31 until the portion 32 thereof passes from the portion 17 into the portion 16 of the casing 15, the material 30 will be forced by the plunger 35 into the vacant portion of the tubular portion 17 of the casing 15, and the heat applied to the die and the pressure applied to the connecting member 31 will be transmitted to the insulating material to fuse and cure the same and force it into all the interstices between the metal parts. This will compact the synthetic resin and accurately align the connecting member 31 since the portion 32 thereof being of a diameter only slightly less than the interior diameter of the tubular portion 17 is accurately guided thereby and travels only a short distance after leaving the tubular portion 17 so that its deflection, if any, is negligible. Deflection is also prevented by the uniform compression of the resin ahead of the rounded point of member 31. By the time the cylindrical portion 32 reaches the enlarged portion of the cavity in the tubular casing 15, the flat lower surface of the plunger 35 will have engaged and started to move the insulating material as well as the connecting member 31. Thus, since some of the material 30 must move at a slightly faster rate than the member 31 due to the proportionately large amount of material to be compressed, the material, in passing along the sides of the enlarged portion 32 of the member 31 will serve to keep the member away from the wall of the casing 15. Furthermore, the rounded point of the member 32 has the effect of uniformly compacting the granular material and causing the member 32 to travel in a straight line, leaving a small amount of insulating material around its peripheral surface so that at no time during the forming of the plug does the member 32 contact with the inner surface of the casing 15. The molding member 27 molds the insulating material and prevents it from entering the bottom portion of the casing 16. The heat and pressure are maintained for a predetermined time until the granular synthetic resin is completely cured and completely surrounds the connecting member 31 to insulate it from the casing 15. The die 21 and die block 24 are then cooled in any well known manner after which the die 21 is removed from the die block 24, the die is opened, and the roughly formed plug removed therefrom and shaped as shown at 37 in Fig. 4. The granular synthetic resin having formed into an infusible and insoluble mass will thus form a sleeve 39 about the connecting member 31 to insulate it from the casing 15.

A part of the casing 16 and a part of the enlarged portion 32 of the connecting member 31 are cut away as shown at 40 and 41, respectively, and tapped holes 43 and 44 are formed in the portion 32 of the member 31 and the casing 16, respectively, to which electrical connectors 45 and 47 contained in a cord 48 threaded into the threaded portion 20 of the casing 16 may be attached by means of screws 49 and 51, respectively. A sleeve 52 of insulating material is slipped on the casing 15 from the top as shown in Fig. 4 and attached thereto by means of a set screw 53 to protect the uninsulated portions of the connectors 45 and 47.

In the practice of the method in manufacturing a three connector plug a tubular member 55 (Fig. 5) is formed comprising a center portion 56 having formed integral therewith and at the upper end thereof an annular shoulder portion 57 and at the other end thereof an end portion 59 of slightly larger diameter into the lower end of which a plug 60 is threaded. The tubular member 55 is placed in a cylindrical die 61 which is formed in two parts 62—62 whose inner surfaces are machined to conform to the shape of the tubular member 55 and which has a cylindrical bore 63 in the top thereof which corresponds to the bore 29 in the die used in making the two connector plug. The upper end of the die 61 has an annular depression 64 formed therein in which a disk 65 having a hole 66 therein of a diameter corresponding to the inside diameter of the center portion 56 of the member 55 may be positioned. The die 61 is then positioned in a cylindrical bore 67 formed in a die block 68 and a predetermined amount of granular synthetic resin 70 is placed in the member 55 and the bore 63 of the die 61. A cylindrical connecting member 69, shaped similarly to the connecting member 31 described hereinbefore in connection with the two connector plug, is forced through the hole 66 in the disk 65 and into the tubular member 55 by a plunger 71 in the same manner that the cylindrical connecting member 31 of the two connector plug was positioned within the casing 15 thereof and the granular synthetic resin 70 is formed into an insoluble and infusible mass about the member 69 in the same manner as has been described in connection with the two connector plug.

The member 55 with the connecting member 69 positioned therein is removed from the die 61 in the same manner as described in connection with the two connector plug and the disk 65 is machined to conform to the outside diameter of the shoulder 57 (Fig. 7). A casing 75 formed similar to the casing 15 of the two connector plug is positioned in a die, and synthetic resin 74 is placed in the casing 75 and in the upper end of the die. The casing 55, the connecting member 69 positioned therein and the insulating material which has been molded and cured between the casing 55 and the connecting member 69 form a part similar to the connecting member 31 of the two connector plug and they are inserted in and insulated from the casing 75 in the same manner that the connecting member 31 was inserted in and insulated from the casing 15 in the two connector plug.

The plug is then machined to the desired shape as shown in Fig. 8 in a manner similar to that described in connection with the two connector plug, and tapped holes are formed in the connecting member 69, the plug 60 and the casing 75 so that connectors 76, 77 and 79 may be attached thereto with screws 80, 81 and 83, respectively. A sleeve 84 of insulating material is then slipped on the casing and attached in the same manner as the sleeve described in the two connector plug was attached to the casing 15 thereof.

Fig. 9 discloses another type of three connector plug which is formed without the disk 65. This second three connector plug may be formed in a manner similar to the plug shown in Fig. 8, except that the die 61 would be shaped differently, the cutout portion 64 not being required.

Although the method is disclosed hereinbefore as applied to the production of connecting plugs, it will be understood that the scope of this invention is to be limited only by the scope of the appended claims.

What is claimed is:

1. A method of manufacturing electrical apparatus which consists in placing insulating material between the elements thereof, and moving one of the elements to compact the insulating material between the elements.

2. A method of manufacturing electrical apparatus which consists in forming the elements thereof to a predetermined shape, assembling them by positioning them in spaced relation, placing an insulating material between the elements, and causing a relative movement between them to compact the insulating material, the form of the elements being such that one of them will guide the other to its ultimate position with respect to the other elements.

3. A method of manufacturing electrical apparatus which consists in forming elements of the apparatus to a predetermined shape, one element being formed to guide another to a predetermined position in assembling them, placing insulating material between the elements, and moving the guided element to compact the insulating material between it and the element formed to guide it.

4. A method of manufacturing an electrical connecting plug which consists in placing elements of the plug with an insulating material therebetween in spaced relation to one another, and applying pressure to one of the elements to mold the insulating material and position said element.

5. A method of manufacturing an electrical connecting plug which consists in placing insulating material in one element thereof, inserting a second element into the first mentioned element, and exerting pressure upon the second mentioned element to consolidate the insulating material between the elements.

6. A method of manufacturing an electrical connecting plug which consists in placing granular synthetic resin in a cavity of a tubular element of the plug, inserting a cylindrical element of the plug therein to consolidate the granular synthetic resin, and simultaneously applying heat and pressure to the elements to fuse and mold the synthetic resin so that the synthetic resin will form an insoluble and infusible mass beween the elements.

7. A method of manufacturing electrical apparatus which consists in placing a plurality of parts with granlular insulating material between them in a predetermined relative position, and simultaneously applying heat to the parts and causing a relative movement between the parts to mold the insulating material therebetween.

In witness whereof, we hereunto subscribe our names this 31 day of May, A. D. 1928.

CLARENCE JOSEPH CALMUS.
JAMES HARVEY TOMLIN.